(12) United States Patent
Piccioni

(10) Patent No.: US 9,126,528 B2
(45) Date of Patent: Sep. 8, 2015

(54) ELECTRICAL COUPLING

(71) Applicant: Frank Piccioni, South Morang (AU)

(72) Inventor: Frank Piccioni, South Morang (AU)

( * ) Notice: Subject to any disclaimer, the term of this patent is extended or adjusted under 35 U.S.C. 154(b) by 127 days.

(21) Appl. No.: 13/887,625

(22) Filed: May 6, 2013

(65) Prior Publication Data

US 2013/0308327 A1 Nov. 21, 2013

Related U.S. Application Data

(63) Continuation of application No. PCT/AU2011/001431, filed on Nov. 7, 2011.

(30) Foreign Application Priority Data

Nov. 5, 2010 (AU) ............................... 2010904929

(51) Int. Cl.
*B60Q 1/00* (2006.01)
*B60D 1/64* (2006.01)
*B60Q 1/26* (2006.01)

(52) U.S. Cl.
CPC ............... *B60Q 1/0088* (2013.01); *B60D 1/64* (2013.01); *B60Q 1/2661* (2013.01)

(58) Field of Classification Search
USPC ........................................................ 362/505
See application file for complete search history.

(56) References Cited

U.S. PATENT DOCUMENTS

| 6,079,136 | A | 6/2000 | Kozlarek | 40/541 |
| 7,118,379 | B1 * | 10/2006 | Wang | 439/35 |
| 7,491,065 | B2 * | 2/2009 | Wagner | 439/35 |
| 7,594,816 | B1 * | 9/2009 | Wang | 439/35 |
| 8,061,879 | B2 * | 11/2011 | Simmons et al. | 362/485 |
| 2005/0037632 | A1 * | 2/2005 | Ihde | 439/35 |
| 2006/0209549 | A1 | 9/2006 | Valdez | 362/485 |

FOREIGN PATENT DOCUMENTS

| JP | 2007-276645 | 10/2007 | |
| WO | WO 02/28670 | 4/2002 | B60D 1/60 |

OTHER PUBLICATIONS

Australian Patent Office, International Search Report, PCT/AU2011/001431, date of mailing Nov. 28, 2011, 3 pages.

* cited by examiner

*Primary Examiner* — Laura Tso
(74) *Attorney, Agent, or Firm* — Sunstein Kann Murphy & Timbers LLP

(57) ABSTRACT

An electrical coupling is for a vehicle and trailer assembly. The coupling is supplied with electricity and comprises a light source for illuminating an area adjacent the coupling.

13 Claims, 12 Drawing Sheets

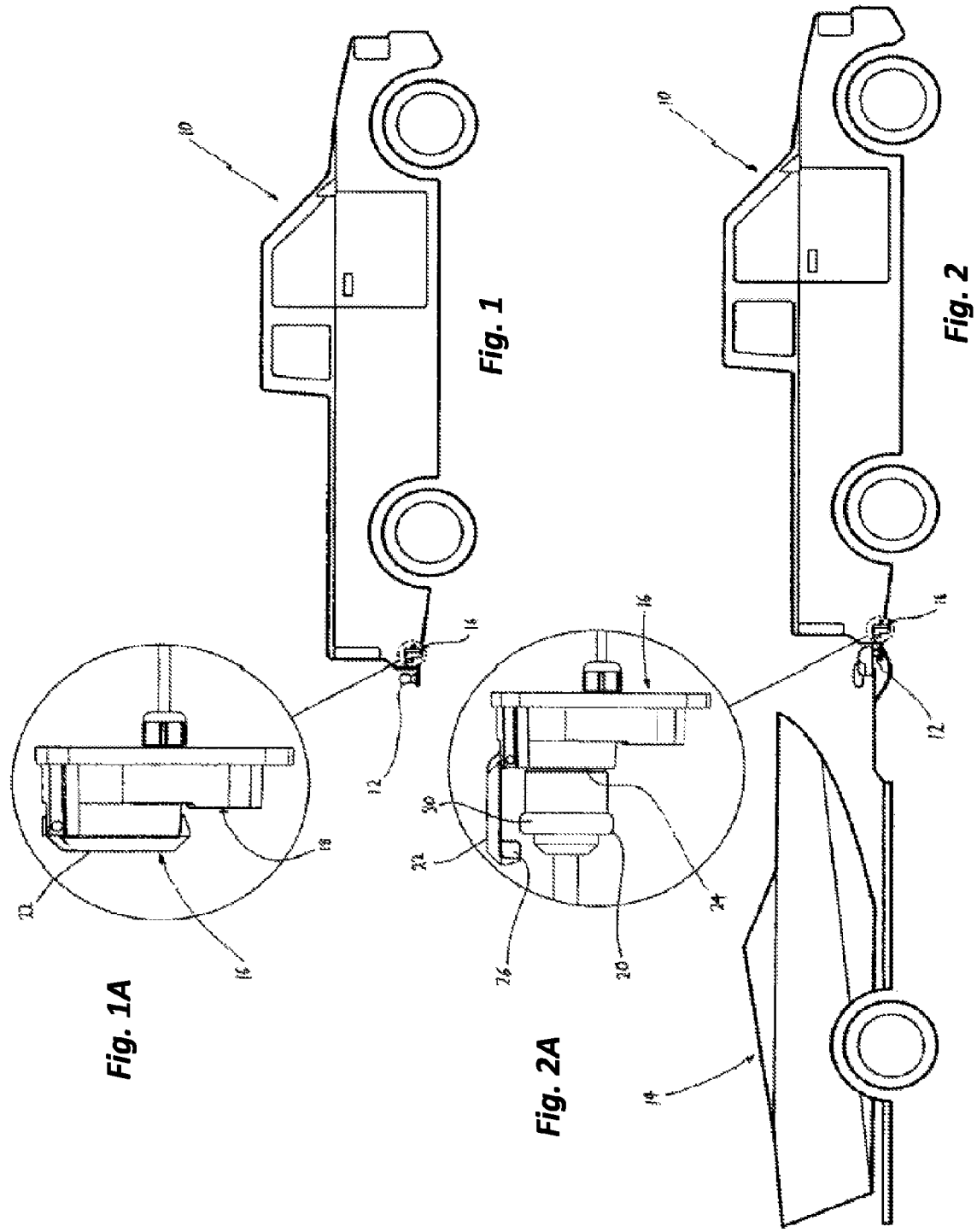

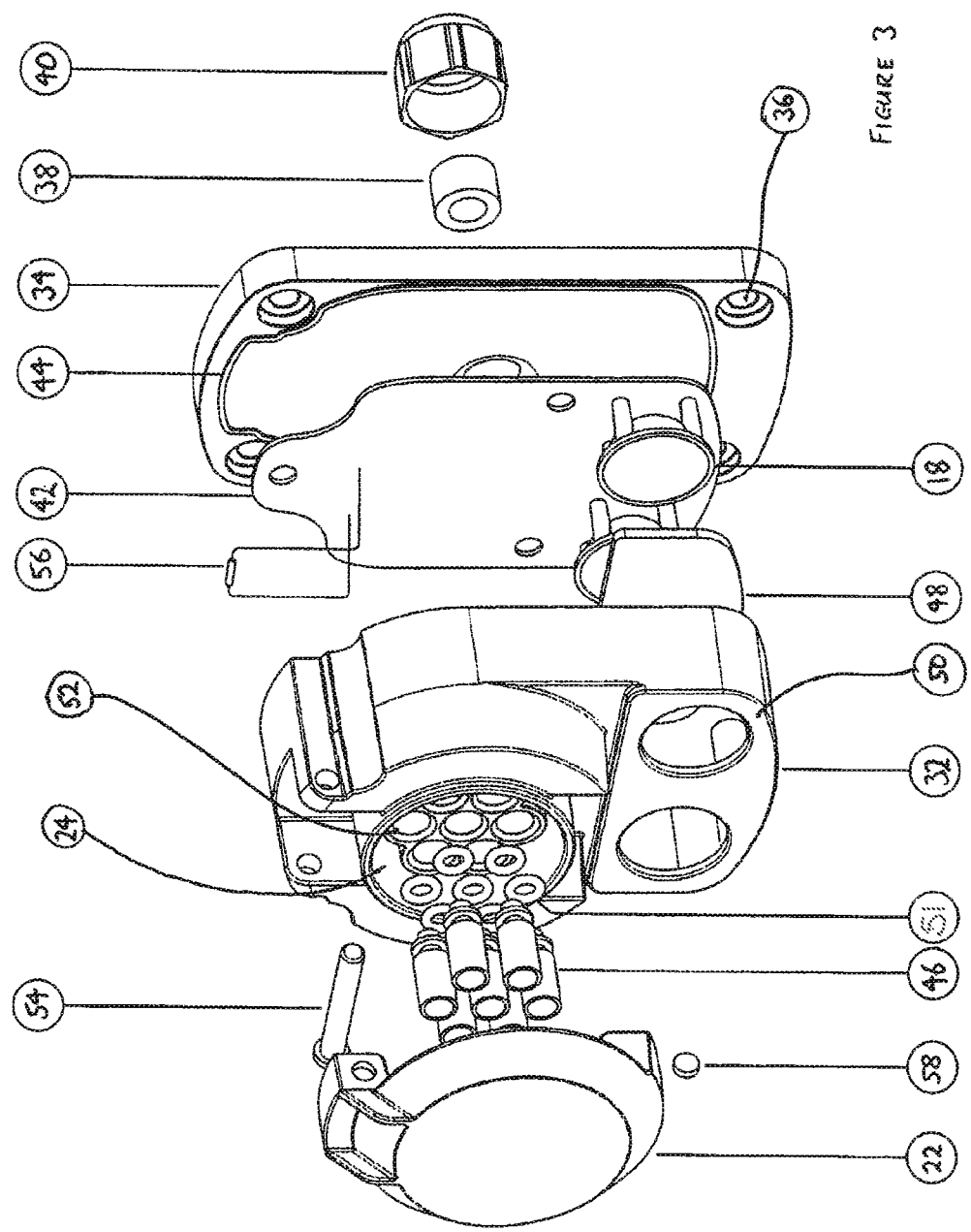

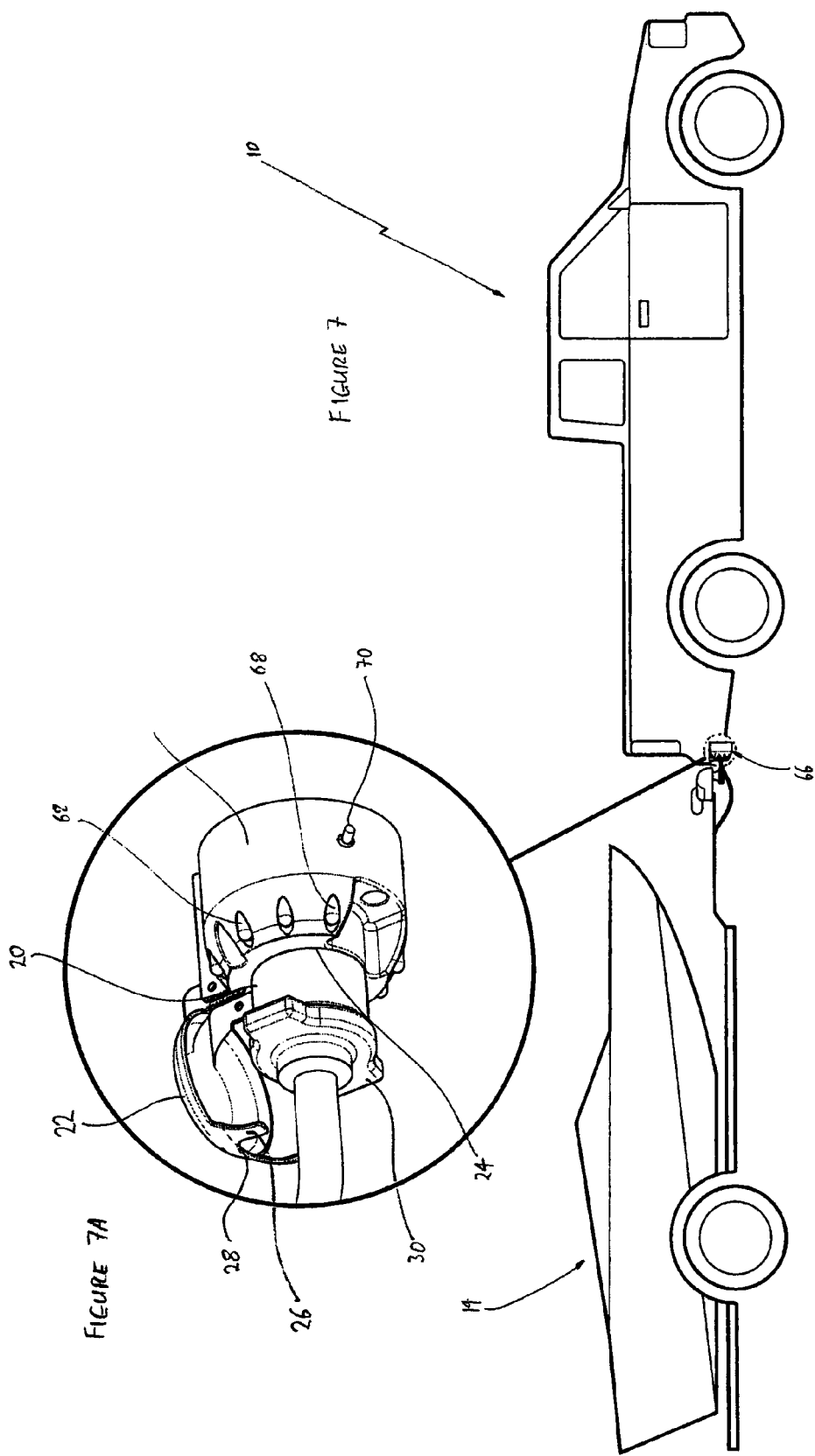

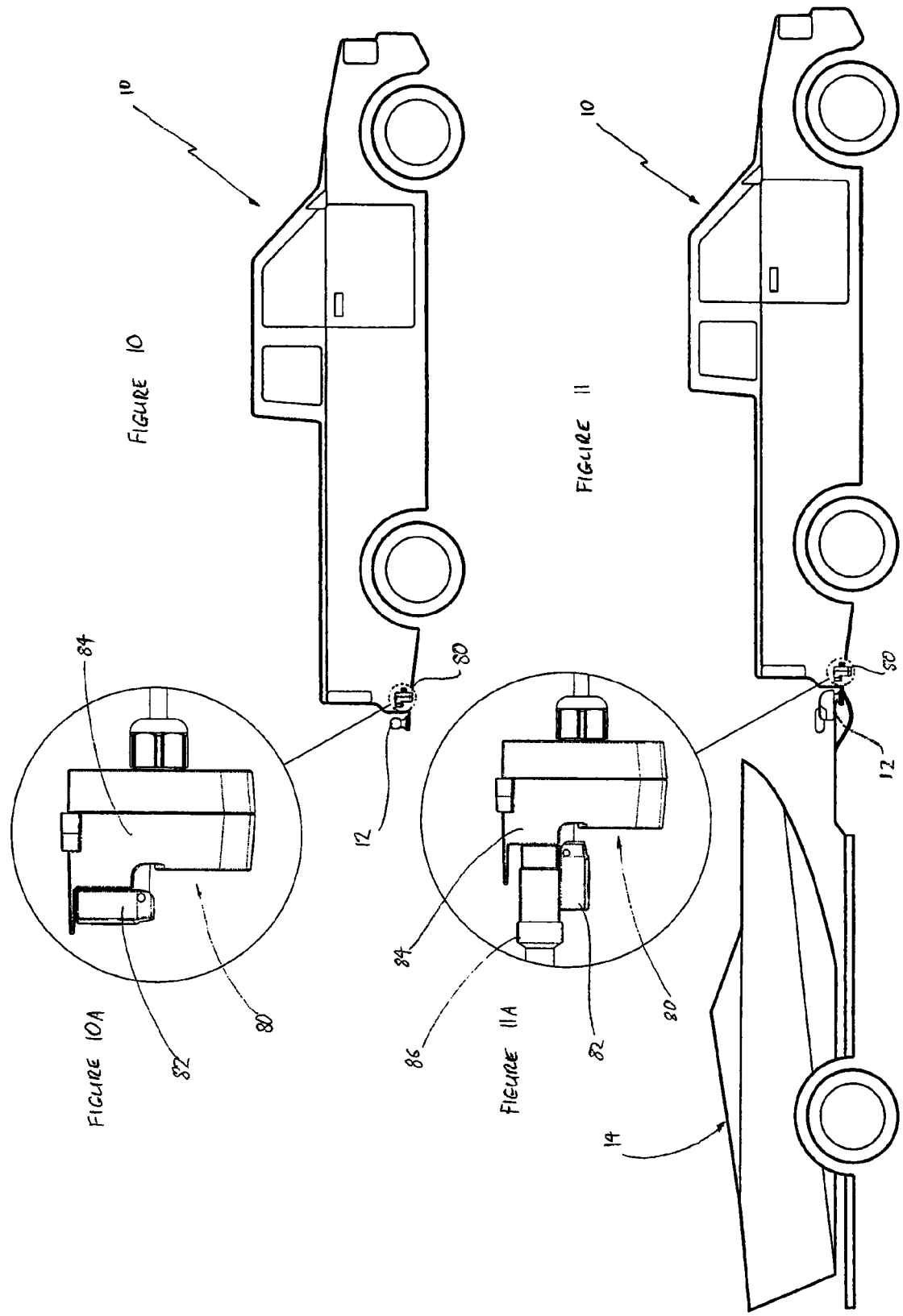

ELECTRICAL COUPLING

This application is a continuation of Patent Cooperation Treaty Application of PCT/AU2011/001431, filed May 2, 2012, which is incorporated herein by reference.

FIELD OF THE INVENTION

The present invention relates to power and/or signal transmitting coupling arrangements between vehicles and auxiliary equipment such as a trailer.

BACKGROUND

When attempting to couple trailers and other auxiliary equipment to vehicles, it can often be a requirement that power and/or signals be transmitted to that auxiliary equipment. Particularly for trailers and other mobile equipment, both power and signals are required to be transmitted for the purpose of replicating the vehicle lighting (e.g. brake lights and indicators) that the mobile equipment might obscure when attached behind the vehicle.

In order to transmit power and/or signals, an electrical system of the auxiliary equipment must be coupled with a system of the vehicle. Generally, this requires the alignment and coupling of a coupling element of the auxiliary equipment with a coupling element of the vehicle. Particularly at night, locating and aligning coupling elements can be very difficult. This problem also exists where vehicles are under a roof, or are large enough to obscure much of the light that would otherwise enable visibility of the coupling elements.

In addition, many countries require auxiliary equipment to be coupled with the vehicle by a ball joint or universal coupling and also by a shackle, the latter being provided in the event that the former fails. When visibility is poor, alignment of ball joints and universal couplings can be time consuming. Similarly, since shackles tend to be connected to the vehicle at an underside of a trailing assembly, there is often poor visibility for effecting coupling of the shackle, even during daylight hours.

It is desired therefore to provide an apparatus for improving visibility at least during coupling.

SUMMARY OF THE INVENTION

In accordance with the present invention there is provided an electrical coupling for a vehicle and trailer assembly, the coupling being supplied with electricity and comprising a light source for illuminating an area adjacent the coupling.

Preferably, the light source is powered by a battery or lighting system of the vehicle or a battery housed within the coupling element.

The vehicle may be a driven vehicle as hereinafter discussed, or may be a trailing vehicle such as a trailer. In this regard, the term 'vehicle' will be understood to include within its scope both driven and trailing, or auxiliary, vehicles. Moreover, the word "trailer" will be understood to mean something that trails behind a vehicle, whether or not it is a flat bed trailer, boat trailer, mobile light system or any other piece of equipment capable of trailing, or being towed behind, a vehicle in the intended manner.

Advantageously, the present invention improves the visibility of couplings and/or shackle points of vehicles.

BRIEF DESCRIPTION OF THE DRAWINGS

Preferred embodiments of the present invention will now be described by way of non-limiting example only, with reference to the accompanying drawings, in which:

FIG. 1 is a side view of a vehicle to which is attached a socket in accordance with the present invention;

FIG. 1A is a close-up view of the socket shown in FIG. 1;

FIG. 2 is a side view of the vehicle of FIG. 1, to which a boat trailer has been mechanically coupled, the boat trailer also being electrically coupled to the socket;

FIG. 2A is a close-up view of the socket shown in FIG. 2;

FIGS. 3 and 4 show front and rear exploded views respectively of a socket of the present invention;

FIG. 7 shows an alternative embodiment of an electrical coupling system or socket according to the present invention mounted on a vehicle;

FIG. 7A is a close-up view of the electrical coupling system of FIG. 7;

FIG. 10 shows an alternative embodiment of a coupling arrangement or socket according to the present invention attached to a vehicle;

FIG. 10A 2A is a close-up view of the socket shown in FIG. 10;

FIG. 11 is a side view of the vehicle of FIG. 10, to which a boat trailer has been mechanically coupled, the boat trailer also being electrically coupled to the socket;

FIG. 11A is a close-up view of the socket shown in FIG. 11;

DETAILED DESCRIPTION

Figure 4:
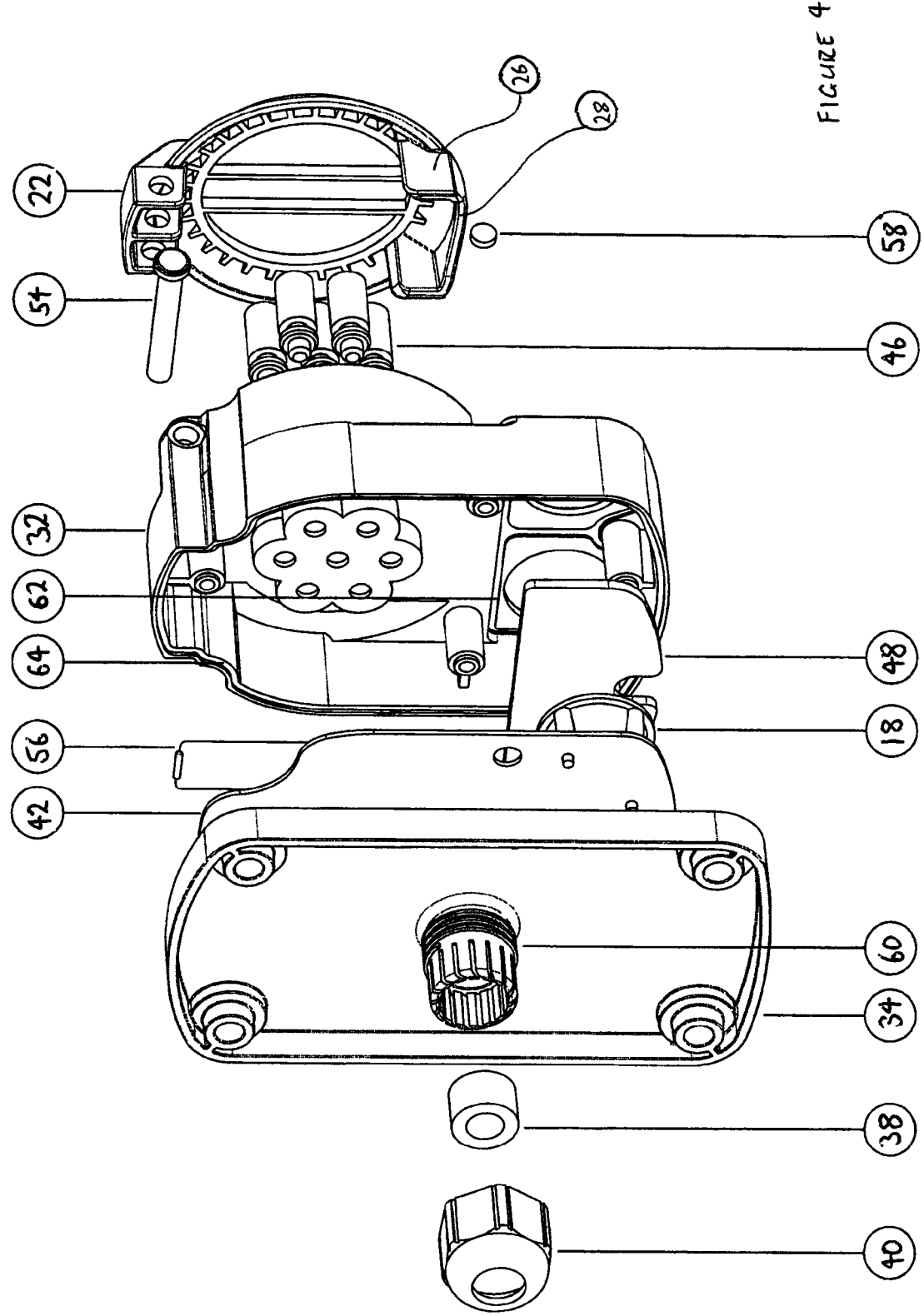

A vehicle 10, as shown in FIG. 1, includes a tow ball 12 to which auxiliary equipment such as a trailer 14 (see FIG. 2) can be attached. The vehicle 10 is fitted with a coupling element, presently socket 16, which comprises a light source 18: the light source provides light in the vicinity of the socket 16.

To provide power to the light source 18, the socket 16 is electrically connected to the lighting circuit (not shown) of the vehicle 10, the lighting circuit being for controlling the lights of the vehicle 10. It will be appreciated the socket 16 may instead house a battery (not shown) or be connected to the battery or other electrical system of the vehicle, in order to provide power to the light source 18.

As discussed above, the trailer 14 is coupled to the vehicle mechanically through the tow ball 12, and is also coupled with the vehicle 10 through an electrical coupling formed by the coupling of first and second coupling elements, those elements presently being socket 16 and plug 20. The socket 16 is attached to the vehicle 10, and the plug 20 is attached to the trailer 14, the plug 20 being receivable in the socket 16. The socket 16 and plug 20 can use any appropriate electrical connection, such as a standard seven- or thirteen-pin round or flat connection, to which a standard plug, such as plug 20, can connect.

The socket 16 has a closed configuration, as shown in FIG. 1A, in which a cover, comprising a lid or dust cover 22, is closed thereby protecting the electrical coupling from environmental conditions. The socket 16 also has an open condition, as shown in FIG. 2A, in which the lid 22 hinges open to expose an aperture 24 in which the plug 20 is received to electrically connect the vehicle 10 and trailer 14. The aperture 24 is a standard connection aperture and need not be described in any further detail.

The lid or cap 22 includes tines 26 between which is defined an arcuate surface 28 (see FIG. 4). The arcuate surface 28 rests against the rear of the plug 20, with a flange 30 of the plug 20 being retained behind the tines 26 between the tines 26 and the aperture 24. In this manner, the tines 26 and arcuate surface 28 prevent inadvertent removal of the plug 20 from the socket 16.

The socket 16, as shown in exploded view in FIGS. 3 and 4, includes a housing comprising a rear housing or backing plate 34 for mounting to e.g. a bumper bar of the vehicle 10, and a front housing 32, the electronics and lighting systems of the socket 16 (discussed below) being housed in the housing members 32, 34.

The rear housing 34, and thus the socket 16, can be mounted to the vehicle 10 in any known manner e.g. using hex-key screws driven into the bumper bar through apertures 36.

The rear housing 34 is substantially rectangular, having rounded ends, though the shape of the rear housing 34 may be adapted to suit a particular arrangement of light source 18 and aperture 24, and a particular shape of the bumper bar or other feature of the vehicle 10 to which the socket 16 is intended to be attached.

To the rear of the housing is a cable gland seal 38 that fits around a cable (not shown) that electrically connects the vehicle 10 to the socket 16. The cable gland seal 38 and cable are retained in place by a cable gland cap 40 in a known manner.

A printed circuit board (PCB) backing plate 42 is sandwiched between the housing portions 32, 34 and is fixed in position when the front surface of the rear housing 34 is connected with the front housing 32 by an ultrasonic weld bead 44 that is coextensive with a periphery of the front housing 32. It will be appreciated that any appropriate means may be used for connecting front and rear housing portions.

The PCB backing plate 42 provides the electronic circuit controlling connection of the lighting system of the vehicle 10 to the pins or main terminals 46 and to the light source 18.

The light source 18 includes one or more, presently two, LEDs. Further, the two LEDs shown in FIG. 3 are high power LEDs capable of being operated in both a high power (bright) mode and a low power (dim) mode. The LEDs 18 are mounted to the PCB 42 in a known manner.

A light permeable panel or cover, presently lens cover 48, is received in a stepped section 50 of the front housing 32 by a friction fit. The light permeable cover 48 at least partially prevents exposure of an internal volume of the housing to atmosphere while allowing light from the light source to escape the housing.

When the front housing 32 is mounted to the rear housing 34 the LEDs 18 emit light through the lens cover 48 and out of the socket 16 though apertures in the stepped section 50. In this manner, the lens covers 48 protects the LEDs from damage (e.g. by dust) and also ensures that light can pass from the socket 16 whilst the socket 16 remains water tight.

Within the aperture 24 is a standard arrangement of terminals 46 that seat into respective sleeves or apertures 52. The terminals 46 are sealed in the apertures 52 by main terminal ring seals 51 in a known manner. Similarly, the lid 22 is mounted to the front housing 32 by a pin 54 in a known manner.

In order to activate the LEDs 18, one or more vehicle conditions may need to be satisfied. In the present case, those conditions include the taillights of the vehicle 10 being switched on, indicating that the headlights are on and thus that visibility is poor. The conditions also include the lid 22 being moved to an open condition (see FIG. 2A) thus indicating that a plug 20 is intended to be coupled with the socket 16.

To determine whether the lid 22 is in the open or closed condition, a reed switch 56 is attached to the PCB 42, the reed switch 56 being activated by the removal of a magnetic field supplied by a magnet 58 attached to the lid 22. As the lid 22 is moved to the open condition, the magnet 58 is distanced from the reed switch 56 thereby removing (or sufficiently reducing) the magnetic field applied to the switch 56. The switch 56 thus activates, satisfying a second condition for illumination of the LEDs 18.

It will be appreciated that the alternative reed switch, namely a reed switch that is active upon application of a magnetic field, may be used with appropriate reconfiguration of the PCB 42 or programs built into a microprocessor in the socket 16 (discussed below).

The socket 16, as shown in rear exploded view in FIG. 4, further includes an integrated cable gland 60 within a cable (not shown) and cable gland 38 are received, the cable gland 38 surrounding the cable. An internal thread of the cable gland cap 40 engages an external thread of the integrated cable gland 60 to fix the cable to the socket 16.

The lens cover 48 is sealed to the housing 32 by an adhesive (e.g. silicon) applied to a groove 62 which groove 62 is substantially coextensive with the periphery of the lens cover 48. It will be appreciated that any other sealing method may be used as appropriate.

The front housing portion 32 is sealed to the rear housing portion 34 by an ultrasonic weld bead 64.

Figure 6:
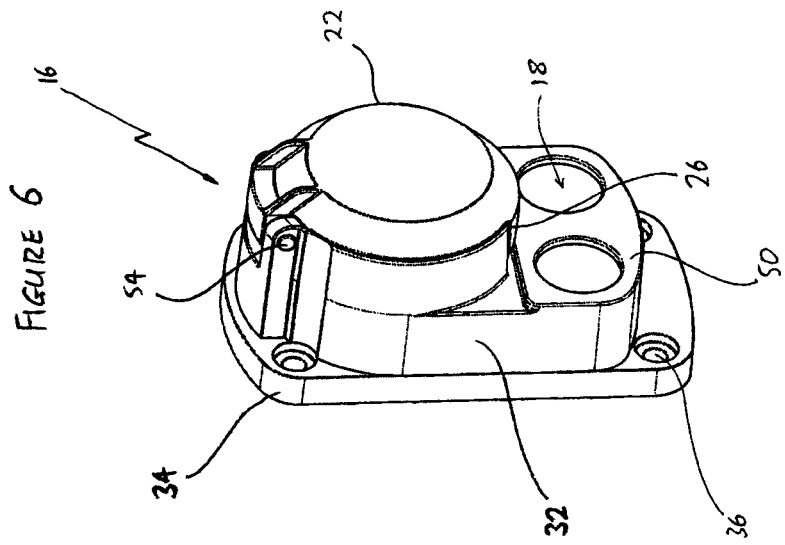
FIG. 6 is a front perspective view of the socket of FIG. 5.
Figure 5:
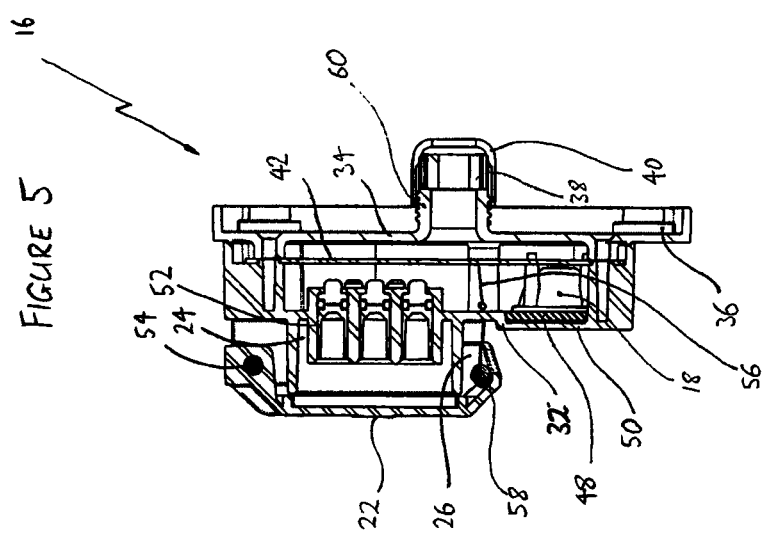
FIG. 5 is a side cross-sectional view of the socket according to FIGS. 3 and 4 in a closed condition.

For the purpose of illustration, the socket 16 is shown in cross-section in an assembled, closed condition in FIG. 5 and in perspective in an assembled, closed condition in FIG. 6.

Figure 8:
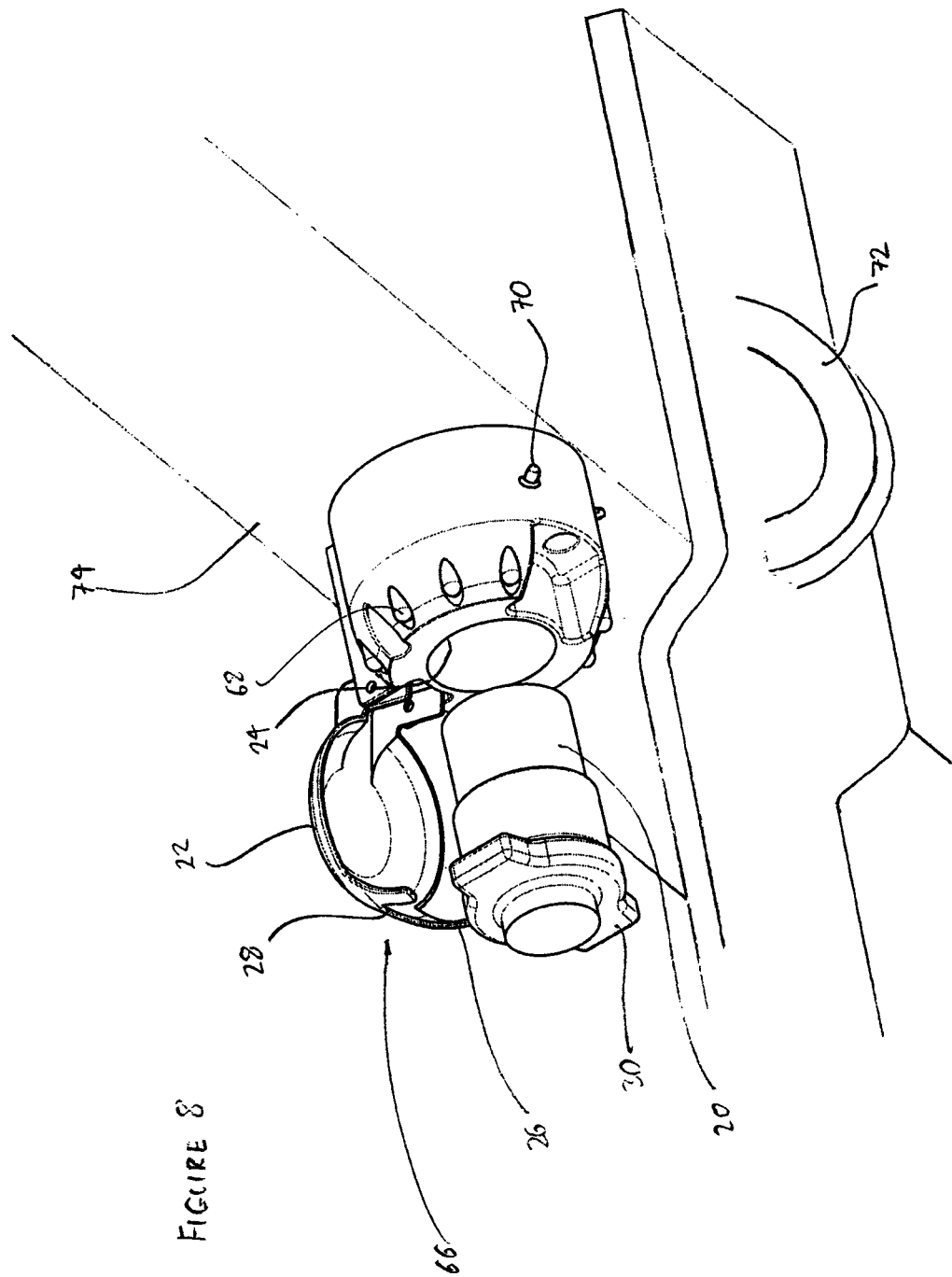
FIG. 8 shows a coupling arrangement or socket according to the present invention in an open configuration.
Figure 9:
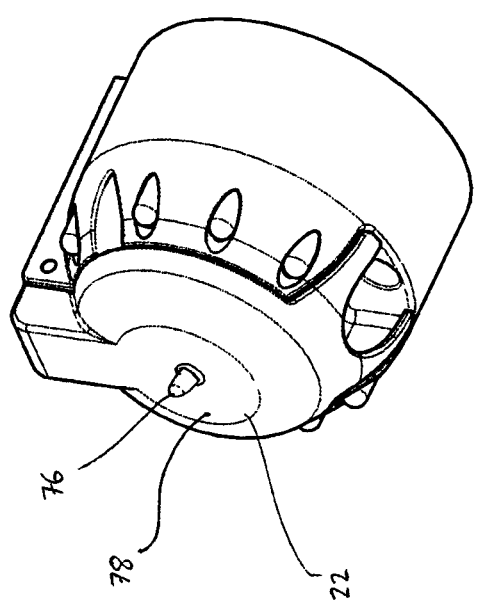
FIG. 9 shows a coupling arrangement or socket according to the present invention in a closed configuration.

An alternative embodiment of a coupling element in accordance with the present teachings, namely socket 66, is shown in FIGS. 7 to 9. Features of the present socket 66 that are the same as features of the previously described embodiment, namely socket 16, will have the same reference numerals.

The socket 66 is provided with a series of small light sources, in the present case LEDs 68 as shown in FIG. 7A, surrounding the aperture 24 for providing light to improve visibility when connecting/disconnecting the plug 20 from the socket 66. The present LEDs 68 are not high power LEDs as previously described, but may be capable of emitting light at various intensities thereby providing for a dim condition and a bright condition as described above.

The LEDs 68 may be powered by a battery or electrical system of the vehicle 10, such as that which powers the tail lights and/or indicators. In this regard, the LEDs 68 may automatically switch on when the headlights of the vehicle 10 are illuminated, indicating that visibility is low, and/or may be illuminated when the reverse lights of the vehicle 10 are illuminated, to improve visibility in an area behind the vehicle 10.

Alternative power sources for the LEDs 68 may include solar cells or a battery (not shown) housed within, or in communication with, the socket 66. The battery may be charged by an electrical system of the vehicle 10 or may be replaceable.

The socket 66 may also be adapted to assist in mechanical coupling/decoupling, by providing further LEDs 70 that illuminate, for example, a shackle mounting 72 on the bumper bar 74 of the vehicle (see FIG. 8). The further LEDs 70 direct light downwardly to illuminate an area underneath the vehicle 10.

The further LEDs 70 may be powered by the same power source as that which powers the LEDs 68.

When not in use, the LEDs 68 of the socket 66, as shown in FIG. 9, may be switched off unless certain conditions, such as the headlights or reverse lights of the vehicle 10 being in use, are met. When in the closed configuration as shown, the lid 22 is hinged back over the aperture 24 to protect the aperture 24 from ingress of contaminants such as dust and dirt. In order to make immediately apparent whether the socket 18 is in the closed or open configuration, a further LED 76 may be provided on the outer surface 78 of the lid 22, which LED 76 is illuminated when the lid 22 is in the closed configuration.

It will be appreciated that LEDs may be provided on the sockets 16, 66 in positions convenient to illuminate any area behind the vehicle 10, as required. Moreover, LEDs may be provided in the plug 20, and be illuminated by a battery and/or solar cell on the trailer 14, or any other power source as appropriate, including a power source that could be used to power the socket 16, 66.

Placing LEDs on the plug 20 will enable the plug 20 to be located in times of poor visibility. Furthermore, the series of LEDs 68 may comprise a single LED or any number of LEDs as appropriate. Moreover, the LEDs may be colour-coded depending on their application (e.g. white when in use with the reverse lights of the vehicle 10 or red when flashing in sync with hazard lights as discussed below).

A further embodiment of a socket 80 in accordance with the present teachings is shown in FIGS. 10 to 15, the socket 80 providing a rectangular (straight) connection rather than a circular connection 16, 66 provided by the sockets 16, 66 shown in FIGS. 1 to 9.

FIG. 10 shows the socket 80 mounted to the rear of a vehicle. The socket 80 is in a closed condition with lid 82 against housing 84. A close-up view of the socket 80 is provided in FIG. 10A.

FIG. 11 shows the socket 80 coupled with a trailer 14, the plug 86 of the trailer 14 being coupled to the socket 80. The manner in which the plug 86 connects with the socket 80 will be widely known in the art and need not be reiterated herein.

Figure 12:
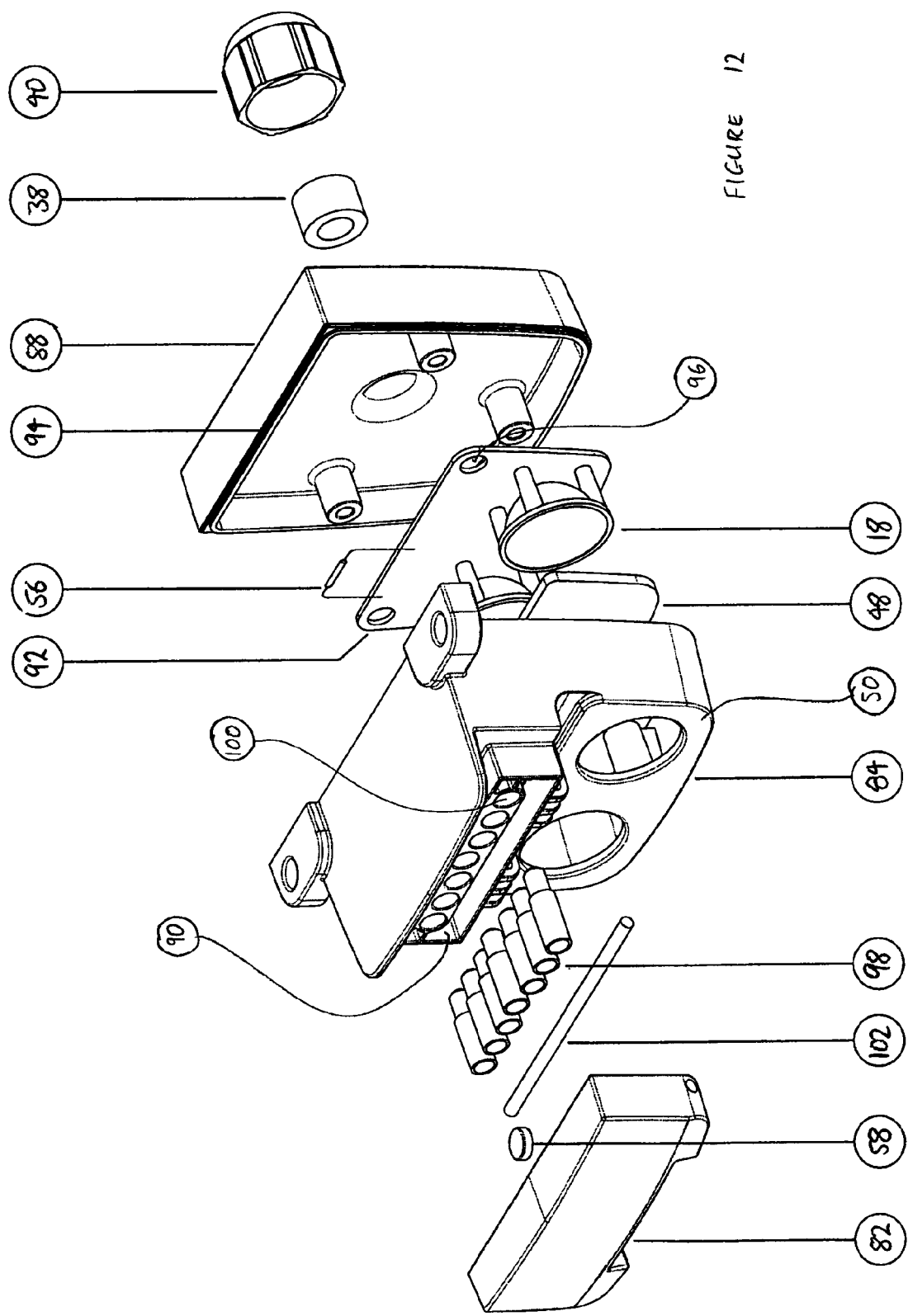
FIGS. 12 and 13 show front and rear exploded views respectively of a socket of the present invention.

The socket 80, as shown in exploded view in FIGS. 12 and 13, includes a housing comprising a rear housing or backing plate 88 for mounting to e.g. a bumper bar of the vehicle 10, and a front housing 84, the electronics and lighting systems of the socket 80 (discussed below) being housed in the housing members 84, 88.

Figure 15:
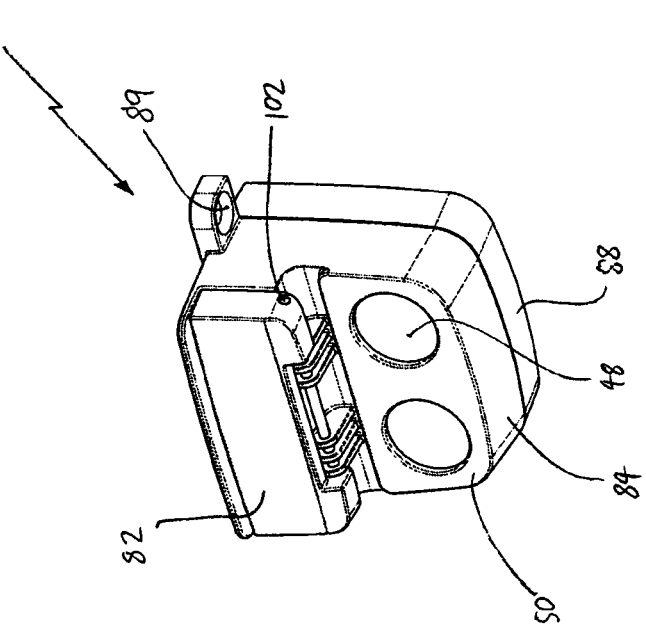
FIG. 15 is a front perspective view of the socket of FIG. 14.
Figure 14:
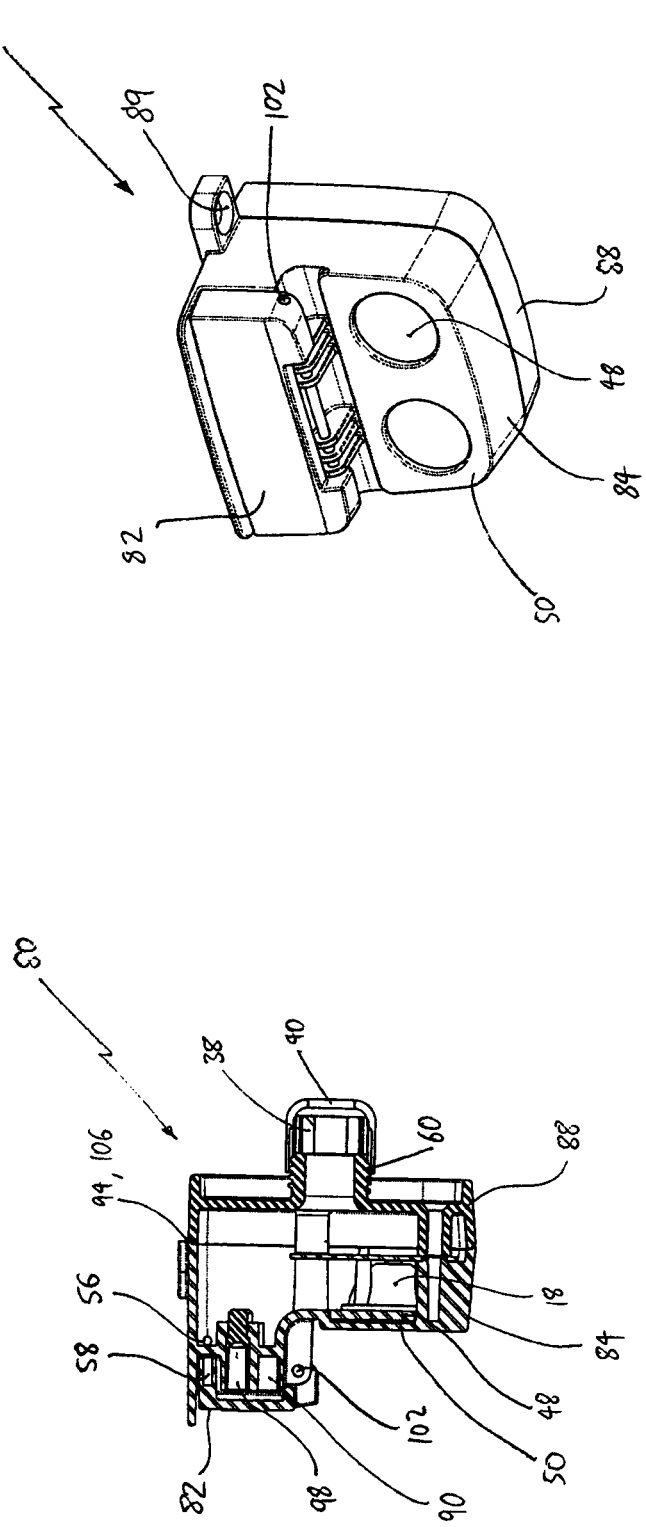
FIG. 14 is a side cross-sectional view of the socket according to FIGS. 12 and 13 in a closed condition.

The rear housing 88, and thus the socket 80, can be mounted to the vehicle 10 in any known manner e.g. by screws received through apertures 89 (see FIG. 15).

The rear housing 88 is substantially rectangular, having a rounded bottom end and a flat top end though, as discussed above in relation to socket 80, the shape of the rear housing 88 (and front housing 84 for that matter) may be adapted to suit a particular arrangement of light source 18 and aperture 90, and a particular shape of the bumper bar or other feature of the vehicle 10 to which the socket 80 is intended to be attached.

To the rear of the housing is the same cable gland seal 38 and cable gland cap 40 arrangement as discussed in relation to FIGS. 3 and 4, and need not be further detailed.

A PCB backing plate 92 is fitted to the front surface of the rear housing 88 by an ultrasonic weld bead 94. The PCB backing plate 92 includes apertures 96 through which screws extend to join the front housing 84 with the rear housing 88, thereby to house the light source 18 and other components of the socket 80.

As with PCB backing plate 42, PCB 92 provides the electronic circuit controlling connection of the lighting system of the vehicle 10 to the pins or main terminals 98 and to the light source 18.

The light source 18 again includes two high power LEDs capable of being operated in both a high power (bright) mode and a low power (dim) mode. The LEDs 18 are mounted to the PCB 92 in a known manner.

A stepped section 50 is again provided for receiving lens cover 48 and has the same function as the lens cover 48 described in relation to FIGS. 3 and 4.

Within the aperture 90 is a standard straight arrangement of terminals 98 that seat into respective sleeves or apertures 100.

The terminals 98 are protected, when the socket 80 is not in use, by lid 82, the lid being mounted to the front housing 84 by a pin 102 in a known manner.

The LEDs 18 are again activated based on the satisfaction of various conditions of the socket 80 as discussed above, and the reed switch 56 and magnet 58 act in the same manner as previously discussed.

Figure 13:
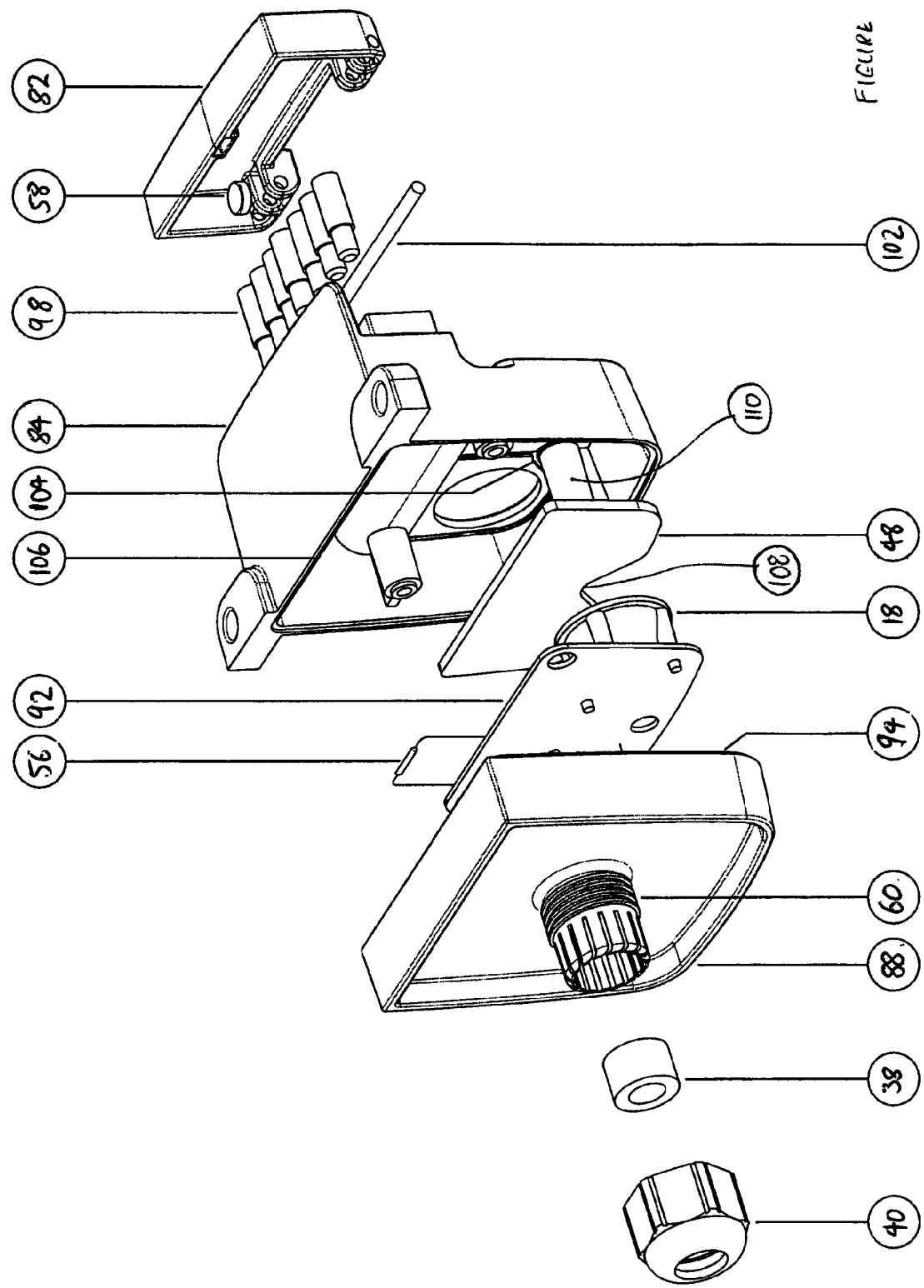

As with the socket 16 as shown in FIG. 4, the socket 80 as shown in rear exploded view in FIG. 13 further includes an integrated cable gland 60 within a cable (not shown) and cable gland 38 are received, the cable gland 38 surrounding the cable. The lens cover 48 is again sealed to the housing 84 by an adhesive applied to a groove 104 substantially coextensive with the periphery of the lens cover 48, and the front housing 84 is sealed to the rear housing 88 by ultrasonic weld beads 94, 106. Again, it will be understood that any appropriate sealing means may be used.

Of note is that the shape of a cutaway 108 in the PCB 48 may be adapted to accommodate a fastener of fastener sleeve 110 the shape of which may change depending of the arrangement of front and rear housing portions 32, 34, 84, 88.

For the purpose of illustration, the socket 80 is shown in cross-section in an assembled, closed condition in Figure and in perspective in an assembled, closed condition in FIG. 6.

In the present embodiment, the socket 16, 66, 80 contains connections for five wires between the trailer 14 and vehicle 10: these wires connect between terminals 46, 98 and include wires for ground (GND), reverse (REV), taillight (TAIL), and left and right hand indicators (LEFT, RIGHT).

The LEDs 18 are only able to be switched on when the headlights or parking lights of the vehicle 10 are on as this indicates that visibility may be poor. Whether or not the headlights or parking lights are on is detected by current passing through the TAIL connection.

With regard to the arrangement of the reed switch 56 and magnet 58, the magnet 58 is positioned on the front lid or cover 22, 82, and the switch 56 is positioned on the backing plate 42, 92 to which the LEDs 18 are mounted. The reed switch 56 has an off condition, in which the lid 22, 82 is in the closed position and the magnet 58 is closest to the reed switch 56, and an on condition, in which the lid 22, 82 is open and the magnet 58 is thereby distanced from the reed switch 56. Thus the presence of a magnetic field deactivates the reed switch 56.

Activation of the reed switch 56 by removal of the magnetic field causes the LEDs 18 to turn on in a low power (i.e. dim) mode to provide good visibility for a user to connect a plug 20 to the socket 16, 66, 80. The LEDs 18 remain on for a predetermined period of time (e.g. 60 seconds) and then switch off to preserve the life of the LEDs 18.

The LEDs 18 may also be illuminated depending on the state of the left and right indicators of the vehicle 10. For example, if the left and right indicators are both flashing, indicating that the hazard lights are on, then the LEDs 18 can be illuminated in sync with the hazard lights.

If the vehicle 10 to which the socket 16, 66, 80 is attached reverses, the LEDs 18 are switched to a high power mode until the vehicle 10 is no longer in reverse gear (as indicated by current passing through the REV connector). In an alternative embodiment, the LEDs 18 may be illuminated in high power mode if the vehicle 10 is put into reverse, then out of reverse and back into reverse within a certain period of time (e.g. 5 seconds) as this would indicate the intention of the driver to have the LEDs 18 illuminated and would avoid illumination of the LEDs 18 when unnecessary or undesirable e.g. when reversing during daylight hours.

A temperature sensor and/or an over-power sensor (not shown) is/are incorporated into the PCB 42, 92 to switch off or otherwise isolate the LEDs 18 if they become too hot or if a power spike is experienced. If the LEDs 18 are switched on for reversing and the temperature sensor senses that the temperature of the LEDs 18 has reached a predefined threshold, then the LEDs 18 may be switched onto low power mode until they cool down. In this manner, damage to the LEDs 18 can be controlled or avoided.

To achieve the above functionality, a microcontroller is incorporated into the electronics (e.g. mounted to the PCB backing plate 42, 92 to which the LEDs 18 are mounted) and is programmed to control the conditions under which the LEDs 18 are illuminated (e.g. hazard light conditions as discussed above) and the period of time for which the LEDs 18 are illuminated.

The microcontroller or the circuit on the PCB 42, 92 may include circuit protections (e.g. switches) that reconfigure/reroute connections used to control the conditions under which the LEDs 18 are illuminated, to protect against e.g.:

Reverse polarity due to incorrect trailer wiring;
Voltage surges (e.g. power spikes as discussed above) from events such as jump starting;
Electrical noise from the vehicle electronics that may interfere with trailer light electronics; and
Electrical noise from the trailer light electronics that may interfere with vehicle electronics.

The electronics in the socket 16, 66, 80 may also include other features:

Reverse speaker that beeps to indicate that the vehicle 10 is reversing;
Reverse camera for transmitting an image of what is behind the vehicle 10 to a display visible to the driver;
Proximity sensors for indicating (e.g. acoustically) to the driver when objects are within a certain distance from the rear of the vehicle 10, the tone altering depending on how close the object(s) is/are.

Figure 16:
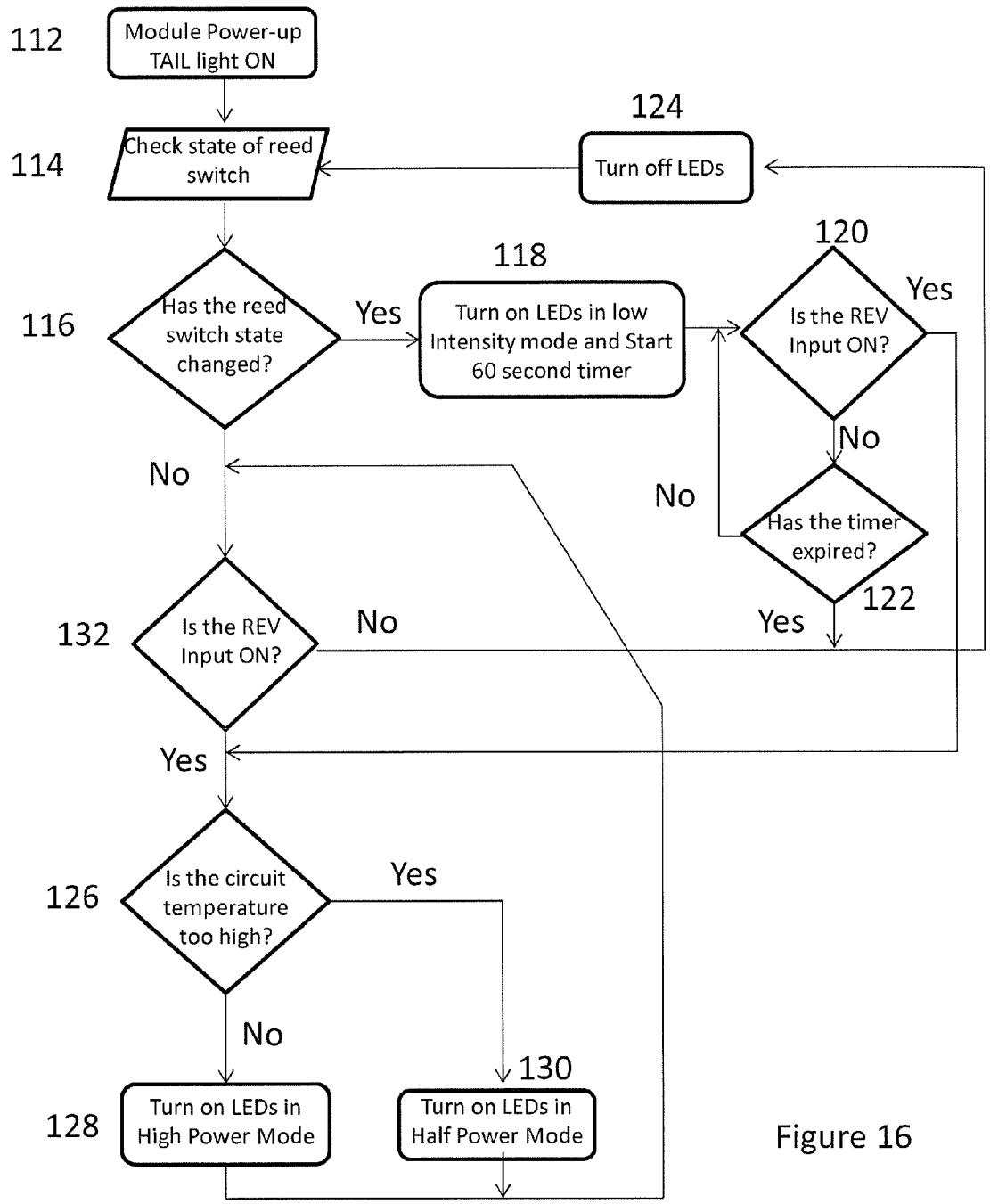
FIG. 16 is a flow chart depicting an exemplary process flow for activating/deactivating the light source of the socket shown in any one of FIGS. 1 to 15.

The basic functionality and general operating process of a socket 16, 66, 80 as described herein is shown in the flowchart in FIG. 16.

The PCB or module 42, 92 powers on by switching on of a taillight of the vehicle 10 (at 112). This does not necessarily mean that the LEDs 18 are switched on but that a condition for the LEDs 18 to be switched on has been satisfied.

The state of the reed switch 56 is checked (at 114). This check can determine if (a) the reed switch 56 in is the on or off condition or (b) whether there has been a change in condition of the reed switch 56. Depending on the manner in which the conditions for illumination of the LEDs 18 have been programmed, conditions (a) and (b) of the reed switch 56 may have different effects.

If there is a change of state of the reed switch 56 (at 116) and any other relevant conditions are satisfied (e.g. the headlights of the vehicle 10 being switched on) to permit for illumination of the LEDs 18, then the LEDs 18 are switched on for a predetermined period of time (at 118). The period of time is presently 60 seconds though any desired period of time may be used.

The process then enters a loop during which it determines whether the REV signal is on or off (at 120). If the REV signal is off but the predetermined time period is yet to expire (at 122), the REV signal is again queried. If the REV signal is off and the predetermined time period expires (at 122), the LEDs 18 are switched off (at 124) and the process awaits a change in state of the reed switch 56 (at 114).

If the REV signal is on the module or program on the microprocessor (discussed below) enters a loop of checking the temperature of the LEDs (at 126) and maintaining high power mode (at 128) or switching to low/half power mode (at 130) as appropriate, and thereafter re-checking whether the REV signal is active (at 132).

Once the taillight is switched off the module or socket 16, 66, 80 powers down.

It will be appreciated that any piece of auxiliary equipment may be attached to the vehicle 10 as appropriate, though the piece of auxiliary equipment in the present embodiment in a boat trailer 14.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The claims defining the invention are as follows:

1. An electrical coupling for a vehicle and trailer assembly, the coupling being supplied with electricity and comprising:
    a light source to illuminate an area adjacent the coupling to facilitate coupling of the vehicle and the trailer assembly; and
    a cover protecting the electrical coupling from environmental conditions, wherein movement of the cover illuminates the light source.

2. An electrical coupling according to claim 1, being mounted to the vehicle.

3. An electrical coupling according to claim 1, being a multi-pin socket of a plug and socket coupling system.

4. An electrical coupling according to claim 1, wherein the light source further comprises a circuit with a switch that is switched by removal or reduction of a magnetic field.

5. An electrical coupling according to claim 4, wherein the magnetic field is formed by a magnet fixed to the cover, the magnet being positioned so that movement of the cover away from the electrical coupling removes or reduces the magnetic field.

6. An electrical coupling according to claim 1, further comprising a housing for housing the light source, light from the light source being visible outside the housing when the light source is illuminated.

7. An electrical coupling according to claim 6, wherein the housing includes one or more apertures through which light from the light source can escape the housing.

8. An electrical coupling according to claim 7, further comprising a light permeable panel for at least partially preventing exposure of an internal volume of the housing to atmosphere, wherein light from the light source passes through the panel to escape the housing.

9. An electrical coupling according to claim 1, wherein the light source comprises one or more LEDs.

10. An electrical coupling according to claim 1, wherein illumination of the light source is controlled based on one or more conditions of the vehicle.

11. An electrical coupling according to claim 1, wherein the light source has a high power (bright) mode, low power (dim) mode and an off mode, the light source being set to one of the modes based on one or more conditions of the vehicle.

12. An electrical coupling according to claim 1, wherein the light source is illuminated for a predetermined period of time after one or more conditions of the vehicle are satisfied.

13. An electrical coupling according to claim 10, wherein the one or more conditions of the vehicle include at least one of: the vehicle being in a reverse gear, hazard lights of the vehicle being activated, and headlights or taillights of the vehicle being activated.

* * * * *